Feb. 14, 1928.
C. E. PARSONS
1,658,939
PROCESS OF MAKING SUBSTANTIALLY PURE HYDROGEN
Filed Sept. 2, 1926    2 Sheets-Sheet 1
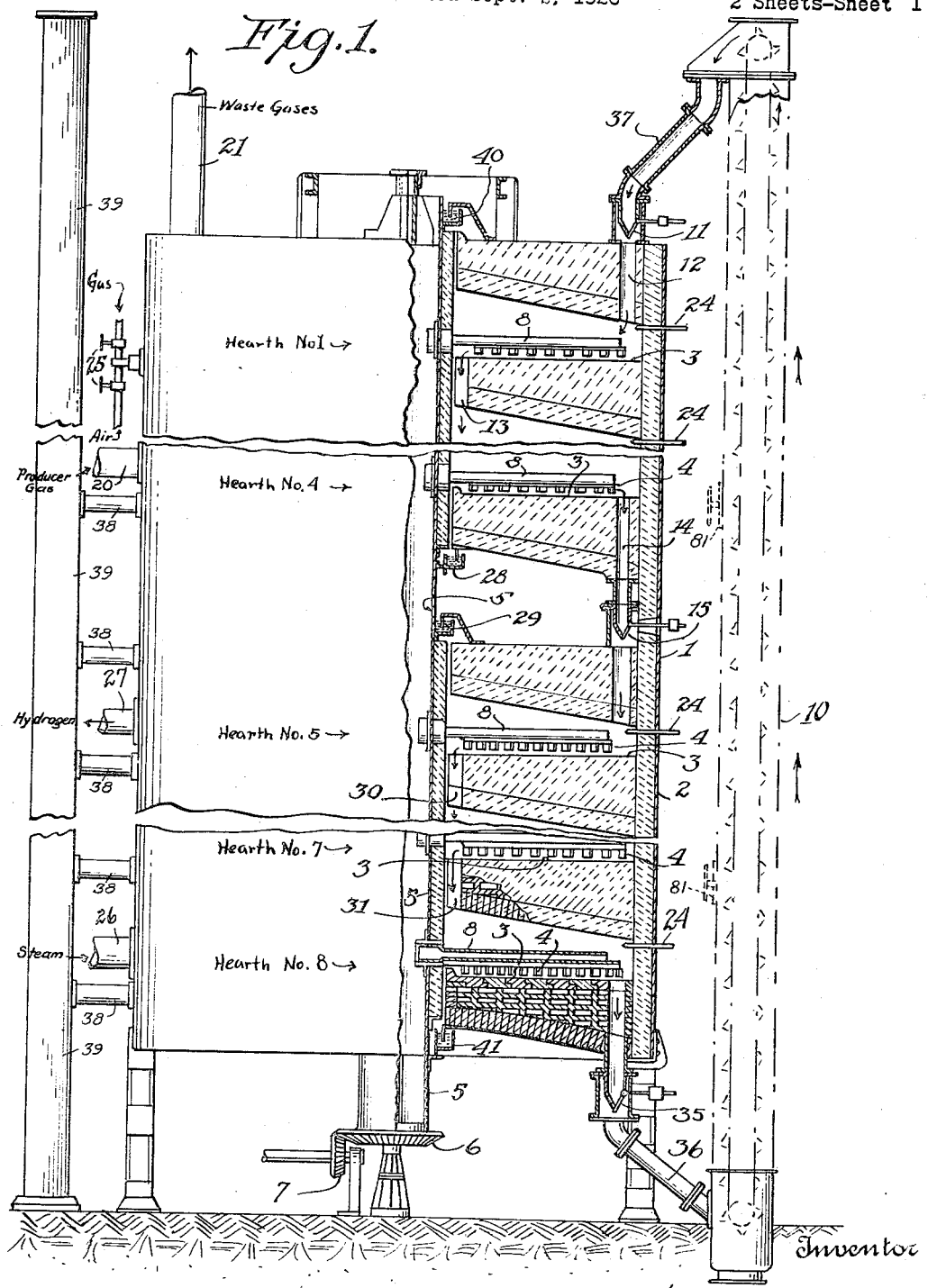
Fig.1.
Inventor
Charles E. Parsons

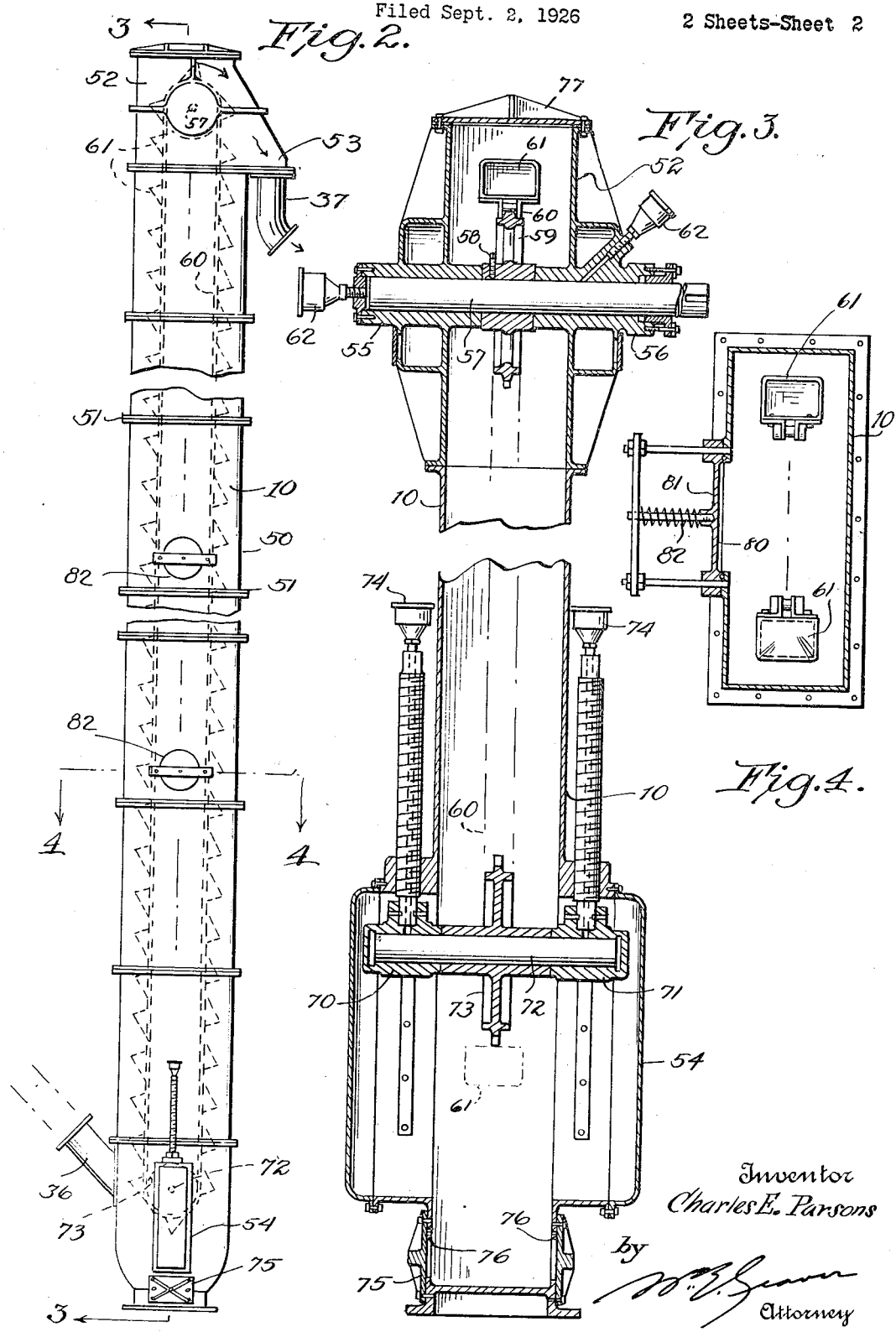

Patented Feb. 14, 1928.

1,658,939

UNITED STATES PATENT OFFICE.

CHARLES E. PARSONS, OF NEW YORK, N. Y., ASSIGNOR TO METAL RESEARCH CORPORATION, OF NEW YORK, N. Y., A CORPORATION OF DELAWARE.

PROCESS OF MAKING SUBSTANTIALLY PURE HYDROGEN.

Application filed September 2, 1926. Serial No. 133,277.

This invention relates to a process of making substantially pure hydrogen by reactions between gases and metallic compounds and has for its object to provide a procedure which will be more expeditious and less costly than those heretofore proposed.

With these and other objects in view, the invention consists in the novel steps and combinations of steps constituting the process, all as will be more fully hereinafter disclosed and particularly pointed out in the claim.

Referring to the accompanying drawings forming a part of this specification in which like numerals designate like parts in all the views,—

Fig. 1 represents in partial section an apparatus for carrying out this process;

Fig. 2 is a fragmentary side elevational view of the elevating apparatus used in connection with the process;

Fig. 3 is a vertical sectional view taken as on the line 3—3 of Fig. 2 and looking in the direction of the arrows; and Fig. 4 is a horizontal sectional view taken as on the line 4—4 of Fig. 2 and looking in the direction of the arrows.

In carrying out this invention one may take finely divided iron oxide from any suitable source, but preferably a precipitated ferric oxide of high purity is employed. The ferric oxide is reduced to elemental iron, and exposed at a suitable temperature to the action of steam which in turn is decomposed by the iron to form ferrous oxide and hydrogen, substantially as follows:

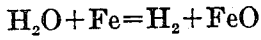

The ferrous oxide is then treated at a suitable temperature with producer gas to reform elemental iron, which is again treated with steam. The chemical cycle of reactions may be stated as follows:—

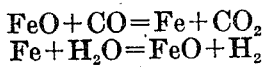

These reactions and the movement of the iron oxide and elemental iron take place in an apparatus so arranged that there is no contact with air during the chemical cycle.

The apparatus is such that the chemical cycle is continuous and in this respect differs from other methods for producing hydrogen by the so called steam iron process. In methods heretofore proposed there has been a reaction between a reducing gas and an iron oxide to change a part of the iron oxide to elemental iron, the flow of reducing gas is then discontinued and steam is passed over the elemental iron to produce hydrogen. The mass of iron oxide is then partially cleared of impurities by passing air through the reaction vessel before again subjecting the iron oxide to the action of a reducing gas. This method of intermittent operation with the metallic compound held "in situ" is an expensive process and presents many operating difficulties which are overcome in this proposed continuous process.

The apparatus shown is a convenient form for carrying out this invention and is the general type of furnace in use for the treatment of ores, such as roasting, desulphurizing etc., with such modifications as make it suitable for carrying out this process.

The furnace is suitably supported and consists of an outer steel shell 1 with fire brick lining 2 carrying a series of muffle heated hearths 3 across which the material to be treated is slowly moved by a series of plows, generally indicated by the numeral 4, four sets of plows for each hearth, said plows actuated by a vertical shaft 5 driven as by the gears 6 and 7 from any suitable source of power, said shaft carrying a set of horizontal rabble arms 8 from which the plows are suspended directly over and in close proximity to each hearth. The rabble arms are cooled in a manner not shown but well understood, such as by air or water which is supplied from the hollow vertical shaft 5.

The ferric oxide with which the cycle of operations is to be started is fed into the lower end of the vertical elevator 10 and is carried upward and discharged through the automatic valve 11, and the passage 12 in the furnace onto the upper hearth, designated as "hearth No. 1." The iron oxide is plowed across this hearth to the center of the furnace, in the direction of the arrows, and falls by gravity through a series of circumferentially spaced drop holes 13 to "hearth No. 2." It is then moved by the plows across this hearth to circumferentially spaced drop holes near the outside of the furnace where it falls to the hearth therebelow. It is then moved across this hearth to the center of the furnace where it passes through drop holes similar to the drop holes 13 to "hearth No. 4" from which after moving across this hearth it is discharged downwardly through the passage 14 and through the automatic valve 15 to the hydrogen producing section of the apparatus.

The producer gas for the reduction of the iron oxide to elemental iron is delivered through the conduit 20 to the chamber above "hearth No. 4" and passes upwardly counter current to the movement of the iron oxide, and is discharged through the passage 21 through the cover over "hearth No. 1".

Hearths numbered one to four together with the cover for hearth number one are arranged with muffles in which is burned the gases which have been discharged from "hearth No. 1". If sufficient heat is not produced from this gas the deficiency will be supplied by the addition of fresh producer gas.

Suitable pyrometers 24, preferably disposed at 180° apart, will be located above each hearth and the temperature preferably controlled by diametrically disposed air and gas valves, generally indicated at 25 and located in the pipes leading to each set of muffles.

The producer gas before entering the chamber over "hearth No. 2" will pass through a recuperator, not shown, where it will be brought to a suitable temperature. The producer gas after formation will pass through suitable apparatus, likewise not shown, where the tar and sulphur will be removed before the gas passes through the recuperator.

The lower hearths, numbered from "5" to "8", comprise the section of the apparatus where the elemental iron and steam reaction occurs, steam being admitted through the conduit 26 and the hydrogen being drawn off through the conduit 27. The construction is the same as the upper section and the muffles are heated in a similar manner, that is, by gas discharged from the chamber over "hearth No. 1", mixed with fresh producer gas when necessary. Pyrometers will be located above each hearth and the temperature regulated by control of the supply of gas and air supplied to the muffles, all as above described.

The space between "hearth No. 4" and "hearth No. 5" contains two water lutes 28 and 29, the former for preventing the escape of producer gas from the upper section, and the latter for preventing the escape of steam or hydrogen from the lower section. This said space also contains the automatic valve 15 through which the elemental iron is discharged downwardly. This said valve further prevents the escape of steam or hydrogen into the upper section of the furnace, all as will be apparent from the drawings.

The elemental iron falls on "hearth No. 5" near the outside wall of the apparatus and is moved by the plows 4 across the hearth to circumferentially spaced drop holes 30, similar to the drop holes 13, near the central shaft where it falls to "hearth No. 6". It is then moved across "hearth No. 6" to the outer edge thereof where it falls to "hearth No. 7" and thence across this hearth until it falls through a plurality of drop holes 31 to "hearth No. 8". By the time the material has passed across "hearth No. 8" it is changed from elemental iron to ferrous oxide, which is discharged through the automatic valve 35 and the closed pipe 36 to the vertical elevator 10 which raises it to the top of the apparatus where it passes through the closed pipe 37 and the automatic valve 11 to "hearth No. 1", where it is again subjected to the action of the producer gas.

This cycle of operations is continuous and if at any time it is desirable to renew the supply of ferrous oxide, a purified ferric oxide may be introduced into the bottom of the vertical elevator 10 through a suitably trapped system to exclude air, and raised to "hearth No. 1" where it is converted to elemental iron and after passing through the apparatus it is returned to "hearth No. 1" as ferrous oxide.

Suitable water lutes 40 and 41 will be installed at the top and bottom respectively of the rotating shaft 5 to prevent the escape of producer gas and hydrogen or the entrance of air.

Suitable piping will be provided to supply gas and air to the muffles and controlled as by the valves 25. The gas and air will be burned at each side of the furnace and the muffles are arranged so that the burning gas and air will be carried half way around the furnace and discharged through a central flue on each side, not shown, but readily understood, so that each set of burners will heat one half of the muffles and the burned gases will be conducted therefrom as through the connections 38 leading to a vertical flue 39 outside the furnace.

The elevator 10, see Figs. 2, 3 and 4, comprises an outer metallic casing 50 which may be made in sections joined as by the flanges 51, it being understood that the entire casing is to be substantially air tight. The casing is provided at its top with a specially constructed housing 52 having an offset portion 53 to which may be secured, in gas-tight relation, the upper portion of the pipe 37 and through which the material is admitted to the top of the furnace apparatus. The bottom section 54 of the elevator comprises, likewise, a special housing to which may be connected the lower extremity of the pipe 36 through which the material from the furnace may pass.

Disposed in the upper housing 52, in suitable opposed bearings 55 and 56 is the shaft 57, driven by any suitable means not shown, upon which is rigidly secured, as by the set screws 58, the sprocket 59 adapted to carry the chain 60 to which is secured in spaced relation a plurality of buckets 61. Suitable lubricating devices, generally indicated at 62, are provided for the bearings of the shaft 57.

The bottom housing 54 of the elevator likewise is provided with suitable opposed bearings 70 and 71 adapted to carry the shaft 72 on which is mounted the sprocket 73 likewise carrying the chain 60 having the buckets 61 thereupon. The bearings 70 and 71 are adapted for longitudinal adjustment of the elevator by any suitable means not shown but readily understood, in order that the chain 60 may be under suitable tension at all times. The bearings 70 and 71 are likewise provided with suitable lubricating means, generally indicated by the numeral 74, and in this respect it should be stated that the entire elevator structure is adapted to be made air tight. In the very bottom of the elevator there may be provided a removable plate 75 covering an aperture 76 should repairs be necessary or material desired to be admitted to the bottom of the elevator. Likewise there is a cover plate 77 at the very top of the elevator.

No considerable pressure is to be expected within the apparatus disclosed in Fig. 1, but it is advisable that the elevator be provided with means for releasing any undue pressure therein in order that the apparatus may not be affected thereby. In order to accomplish this result, at suitable intervals, the elevator casing is provided with explosion openings 80, each closed by a cover 81 adapted to be controlled by a spring 82, see Fig. 4.

The operating cycle in which the ferrous oxide in the upper chamber is reduced to elemental iron by means of producer gas and the elemental iron then reacted upon by the steam to produce hydrogen and ferrous oxide, is repeated indefinitely, each reduction in the upper chamber resulting in the formation of $CO_2$ gas which is drawn off, and each reoxidation in the lower chamber resulting in the liberation of hydrogen at the expense of steam, while the hydrogen is saved, in a substantially pure form.

It is an essential feature of this process that in the upper or iron oxide reducing section, the temperature of the ferrous oxide in process of being reduced to elemental iron shall never exceed 600° C., preferably at a temperature between 400° C. and 550° C., in order that the elemental iron thus produced shall be positively pyrophoric, and consequently very active chemically. It is also essential that in the oxidation section, in which the pyrophoric iron is oxidized to ferrous oxide by means of steam or water vapor, that the temperature of the mass of metal and oxide in course of transformation, shall never exceed 700° C. in order to prevent the formation of magnetic iron oxide.

An important feature of the procedures disclosed resides in the fact that the efficiency of the reduction of ferrous oxide in the upper section by means of producer gas is very high. In other words, in practice, if a high efficiency cannot be reached, serious objectional commercial conditions as regards cost are imposed. Further, by the employment of ferrous oxide (FeO), in this process there is obtained a distinct advantage, in that the necessary number of molecules of reducing gas compared to the molecules of the iron produced is lower by from ¼ to ⅓ than is the case when we compare the same volume of gas with ferric oxides heretofore proposed. This fact is well illustrated in the case of the ferrous oxide (FeO), as will be clear when we compare the same quantity of metallic iron, Fe, and employ in our process successively reaction quantities of CO with FeO, $Fe_3O_4$, and $Fe_2O_3$, as will be shown by the following equations:—

$12FeO + 12CO = 12Fe + 12CO_2$ or 1 CO for 1 Fe.

$4Fe_3O_4 + 16CO = 12Fe + 16CO_2$ or 1.33 CO for 1 Fe.

$6Fe_2O_3 + 18CO = 12Fe + 18CO_2$ or 1.50 CO for 1 Fe.

That is to say, it will be noticed if magnetic iron oxide be used, ($Fe_3O_4$), one third more carbon monoxide (CO) must effect contact for the same amount of metallic iron produced than if FeO is employed. It is obvious therefore that it is very desirable indeed to use a metallic compound such as FeO in the upper chambers which will readily taken up one atom of oxygen to each molecule of carbon monoxide or hydrogen, and will readily take up one atom of oxygen in the lower chambers from each molecule of steam. After the desired hydrogen is thus produced it may be recovered by any suitable means, as for example, by collecting it in a gas holder.

It is obvious that the exact construction shown in the accompanying drawings need not be employed, inasmuch as said construction is only illustrative of the means by which the process is carried out. Therefore it is not desired to be limited to said construction, nor is it desired to be limited to the actual steps of the procedure as outlined above except as may be demanded by the claim, it being understood that suitable variations in the steps may be carried out without departing from the spirit of the invention.

What is claimed is:—

The continuous process of producing hydrogen which consists in reacting on ferrous oxide (FeO) with producer gas at a temperature below 600° C. to produce elemental pyrophoric iron; reacting on said iron with steam at a temperature below 700° C. to prevent the formation of magnetic iron oxide ($Fe_3O_4$); recovering the hydrogen thus liberated; and reusing the ferrous oxide thus produced in the cycle to obtain more hydrogen.

In testimony whereof I affix my signature.

CHARLES E. PARSONS.